United States Patent
Pyzik et al.

(10) Patent No.: US 8,101,283 B2
(45) Date of Patent: Jan. 24, 2012

(54) COMPOSITE MATERIAL AND METHOD OF MAKING THE COMPOSITE MATERIAL

(75) Inventors: Aleksander Jozef Pyzik, Midland, MI (US); Robert Alan Newman, Midland, MI (US); Alveda J. Williams, Pearland, TX (US); Shaofu Wu, Sugar Land, TX (US)

(73) Assignee: Dow Global Technologies LLC

(*) Notice: Subject to any disclaimer, the term of this patent is extended or adjusted under 35 U.S.C. 154(b) by 1125 days.

(21) Appl. No.: 11/827,942

(22) Filed: Jul. 13, 2007

(65) Prior Publication Data

US 2008/0014455 A1    Jan. 17, 2008

Related U.S. Application Data

(60) Provisional application No. 60/831,038, filed on Jul. 14, 2006.

(51) Int. Cl.
*C22C 32/00* (2006.01)
*B32B 3/12* (2006.01)
*B01D 39/06* (2006.01)
*B01D 39/08* (2006.01)
*B01D 50/00* (2006.01)
*B01D 53/34* (2006.01)

(52) U.S. Cl. ......... 428/539.5; 428/116; 55/523; 55/525; 422/181; 422/182; 422/180; 422/183

(58) Field of Classification Search ............... None
See application file for complete search history.

(56) References Cited

U.S. PATENT DOCUMENTS

| | | | |
|---|---|---|---|
| 3,310,387 A | 3/1967 | Sump et al. | |
| 4,200,604 A | 4/1980 | Dziedzic et al. | |
| 4,702,770 A | 10/1987 | Pyzik et al. | |
| 4,861,638 A | 8/1989 | Huether | |
| 4,948,676 A * | 8/1990 | Darracq et al. | 428/539.5 |
| 5,007,475 A | 4/1991 | Kenney et al. | |
| 5,020,584 A | 6/1991 | Aghajanian et al. | |
| 5,298,468 A | 3/1994 | Pyzik | |
| 5,298,469 A | 3/1994 | Haig et al. | |
| 5,308,422 A | 5/1994 | Askay et al. | |
| 5,338,598 A | 8/1994 | Ketcham | |
| 5,350,637 A | 9/1994 | Ketcham et al. | |
| 5,521,016 A | 5/1996 | Pyzik et al. | |
| 5,775,403 A | 7/1998 | Premkumar et al. | |
| 5,864,743 A | 1/1999 | Tuchinskiy et al. | |
| 6,298,957 B1 | 10/2001 | Haug et al. | |
| 6,599,466 B1 | 7/2003 | Moxson et al. | |
| 6,630,247 B1 | 10/2003 | Fox et al. | |
| 6,709,739 B1 | 3/2004 | Mullen et al. | |
| 6,767,619 B2 | 7/2004 | Owens | |
| 6,803,015 B2 | 10/2004 | Vanee et al. | |
| 6,895,851 B1 | 5/2005 | Adams et al. | |
| 2002/0086165 A1 | 7/2002 | Davis et al. | |
| 2004/0123573 A1* | 7/2004 | Ichikawa et al. | 55/523 |
| 2004/0146736 A1 | 7/2004 | Ivanov et al. | |
| 2004/0255768 A1 | 12/2004 | Rettenbacher et al. | |

(Continued)

*Primary Examiner* — Gordon R Baldwin

(57) ABSTRACT

A composite is formed by inserting a ceramic powder into a channel of a preform to form a ceramic powder filled preform. The ceramic powder has at least one reactive ceramic powder. The preform is a ceramic, ceramic-metal composite, metal or combination thereof that has walls that define a plurality of channels each channel having an opening at a surface of the preform. The ceramic powder filled preform is infiltrated with a molten metal to form the ceramic-metal body, which has at least one ceramic phase that is a reaction product of the reactive ceramic and molten infiltrated metal.

20 Claims, 4 Drawing Sheets

U.S. PATENT DOCUMENTS

| | | |
|---|---|---|
| 2005/0081963 A1* | 4/2005 | Pyzik et al. ............... 148/437 |
| 2005/0115214 A1 | 6/2005 | Saha et al. |
| 2005/0133188 A1 | 6/2005 | Fick et al. |
| 2005/0147829 A1 | 7/2005 | Manoharan et al. |
| 2005/0183909 A1 | 8/2005 | Rau, III et al. |
| 2005/0191510 A1 | 9/2005 | Gordon et al. |

* cited by examiner

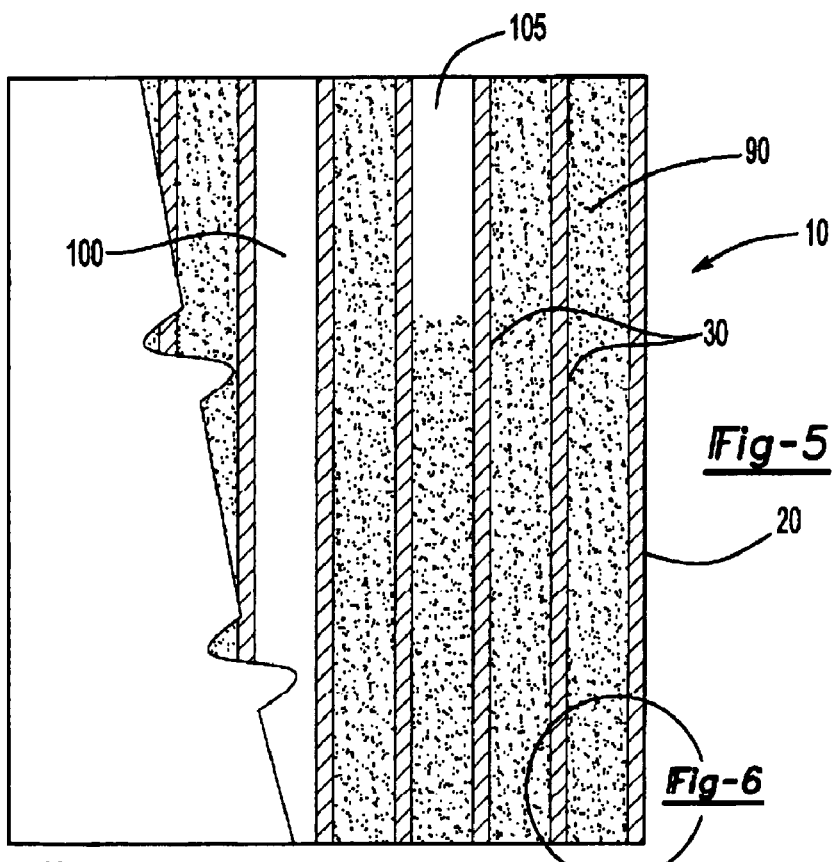
_Fig-5_
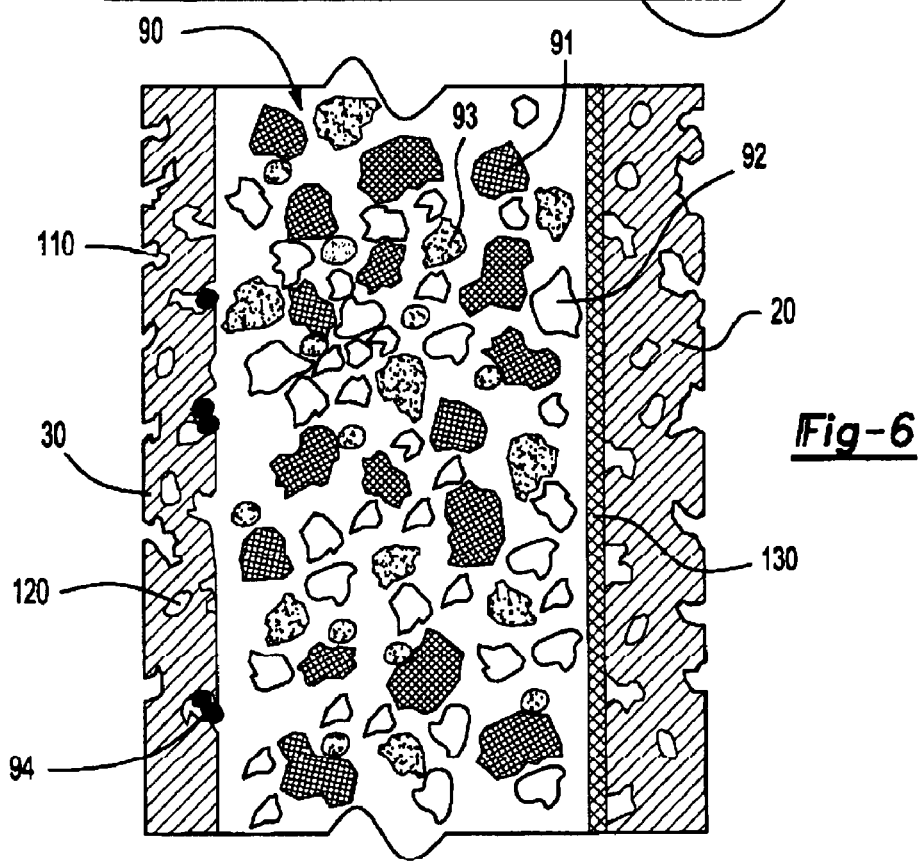
_Fig-6_

COMPOSITE MATERIAL AND METHOD OF MAKING THE COMPOSITE MATERIAL

CROSS-REFERENCE TO RELATED APPLICATIONS

This application claims the benefit of U.S. Provisional Application No. 60/831,038, filed Jul. 14, 2006.

FIELD OF THE INVENTION

The invention relates to the formation of a macro-composite of a ceramic-metal composite within a monolithic ceramic, metal, ceramic-metal composite or combination thereof.

BACKGROUND OF THE INVENTION

Over the past several decades, many ceramic-metal composites have been developed to attempt to make materials having the advantages of ceramics (e.g., stiffness and high temperature resistance) and metals (e.g., toughness and formability) in the same material while minimizing the disadvantages of each. For example, ceramic-metal composites in which metals are reinforced with ceramic particulates of various geometries (e.g., whiskers) and ceramic fibers have been produced. Typically, such ceramic-metal composites are formed by co-sintering metal and ceramic powders, infiltrating a molten metal into a porous ceramic preform or introducing ceramic particulates into a molten metal, which is then cast.

Laminates of ceramics and metal foils are also quite common with an example being capacitors. Coatings of ceramics on metals or metals encapsulated by ceramics to reduce oxidation have been developed such as porcelain enameled cookware. Single layer laminates or coatings of ceramics and ceramic metal composites on metals have been described for making brake rotors. Likewise, tungsten carbide-cobalt has been brazed or welded on many metals to form cutting implements such as carbide tipped saw blades and drill bits.

Each of the aforementioned, however, have failed to exploit the properties of a ceramic particulate based ceramic-metal composite combined with a metal or ceramic monolithic part.

SUMMARY OF THE INVENTION

The present invention is a method of making a ceramic-metal body comprising, a) inserting a ceramic powder into a channel of a preform to form a ceramic powder filled preform, the preform being (i) a ceramic, ceramic-metal composite, metal or combination thereof and (ii) having walls that define a plurality of channels each channel having an opening at a surface of the preform, wherein the ceramic powder is comprised of a reactive ceramic powder and the ceramic powder has a maximum particle size smaller than the smallest channel diameter of the channels, and b) infiltrating the ceramic powder filled preform with a molten metal to form the ceramic-metal body.

The use of such a method allows for the creation of a ceramic-metal body comprised of a matrix that is a ceramic, metal, ceramic-metal or combination thereof, the matrix having walls that define channels within the matrix wherein within at least one channel of the matrix is a channel ceramic-metal composite that has a different microstructure, chemistry or combination thereof than the walls of the matrix and the channel ceramic metal composite is comprised of a channel metal and a channel ceramic phase, the channel ceramic phase being comprised of a reactive ceramic and a ceramic reaction product of the channel metal and the reactive ceramic.

The ceramic-metal body may be used in any application that metals, ceramics or ceramic-metal composites have been used such as, but not limited to, vehicular structural components, braking components, suspension components, engine components, casings, sports equipment, wheels, cables, wires, plating, gears, seals, shafts, tools and the like. The ceramic-metal body may be further joined to other bodies of differing materials to make other components.

BRIEF DESCRIPTION OF THE DRAWINGS

FIG. 5 is a cut away side view of the preform of FIGS. 1 and 2 after insertion of ceramic powder into the channels of the preform.

FIG. 6 is an enlarged cross-section of a portion of a channel filled with powder in FIG. 5.

DETAILED DESCRIPTION OF THE INVENTION

Forming the Ceramic-Metal Body

Figure 1:
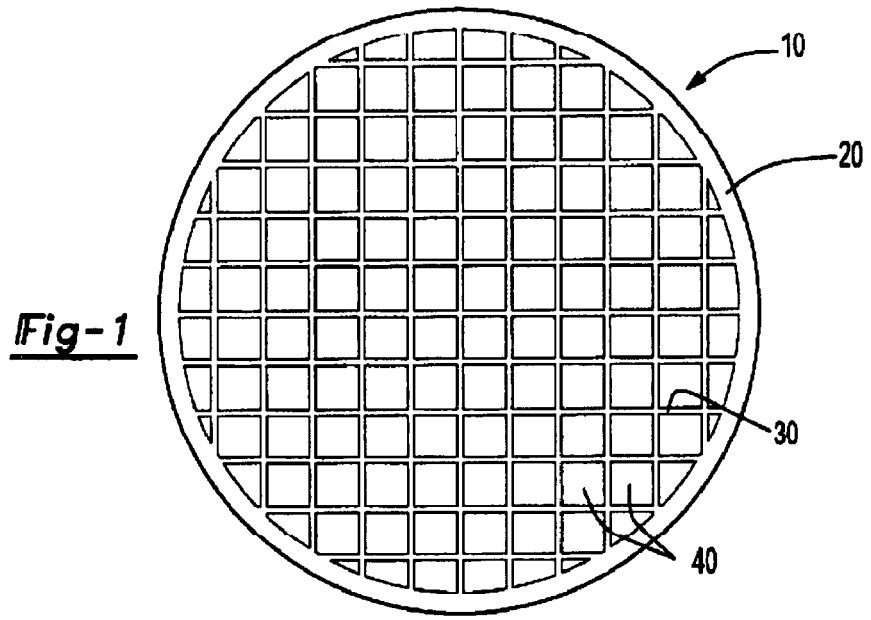
FIG. 1 is a view looking down the channels of a preform useful to make the ceramic-metal body of the present invention, the preform being in the shape of a honeycomb.

Referring to the Figures, the preform 10 may be a ceramic, metal, ceramic metal composite or combination thereof. For example, the outer wall 20 may be a metal and the inner walls 30 may be a ceramic or ceramic-metal composite or vice versa. In addition, some of the inner walls 30 may be ceramic with the remaining inner walls 30 being metal and/or ceramic-metal composite with any combination being suitable. Either one or all of the inner walls 30 or outer wall 20 may be a combination of metal, ceramic or ceramic-metal composite such as in a laminate structure, an example, being a coating or cladding 130 upon outer wall 20 as illustratively shown in FIG. 6. When such a coating or cladding 130 is present, it is preferred that the coating or cladding 130 is a metal. It is further preferred that such coating or cladding 130 facilitates or enhances the wetting and/or bonding of the channel metal 160 to the walls 20 and 30 of the preform 10. Channel 40 may be blocked off on one end by plug 50 inserted into channel 40, or barrier 60 affixed to the end of the preform 10. The barrier 60 and plug 50 may be of any material as described for the walls 20 and 30.

The walls 20 and 30 may be porous or essentially dense and any combination within the preform 10. That is the walls 20 and 30 or portions of the walls 20 and 30 may have open porosity 110 and/or closed porosity 120 or be essentially dense. Essentially dense herein means a density of at least 99% of theoretical. Illustratively, the walls may have a porosity of 85% to no detectable porosity using standard methods to determine density or as determined using well known microscopy techniques such as metallographic techniques including quantitative stereology of a scanning electron micrograph of a polished section of the composite using the intercept method described by Underwood in *Quantitative Stereology*, Addison-Wesley, Reading, Mass. (1970). Preferably, the walls have a porosity less than about 75%, more preferably less than about 70%, even more preferably less than about 65% to essentially dense, preferably at most about 1% porosity, more preferably at most about 5% porosity, even more preferably at most about 10% porosity and most preferably at most about 20% porosity.

When open porosity 110 is present in the preform 10, it is desirable, depending on application, to have such porosity to be of a size and shape such that at least some portion of the inserted ceramic powder 90 is able to penetrate 94 (penetrated inserted ceramic powder) said open porosity 110. Likewise, depending on the application, it may be desirable for the inserted ceramic powder 90 to essentially fail to penetrate the open porosity 110 (essentially fail in this context means that by standard micrographic techniques less that 1% of the volume of open porosity 110 has been penetrated). In a preferred embodiment, at least 5 percent of the volume of any open porosity 110 of the walls 20 and 30 are occupied by penetrated inserted ceramic powder 94. Preferably, the volume of the open porosity 110 that is penetrated is at least about 10%, more preferably at least about 20% and most preferably at least about 30% to desirably a volume that is essentially the same as that occupied by ceramic powder 90 inserted in the channel 40 defined by the walls 20 and/or 30.

To reiterate, the preform 10 may be a ceramic, metal, ceramic metal composite or combination thereof. In a preferred embodiment, the preform 10 is a metal. The metal preferably is aluminum, iron, copper, nickel, zinc, magnesium, titanium, tantalum, tungsten, silicon, alloy of any one of the aforementioned or combination thereof. Preferably, the metal is iron, nickel, copper, aluminum, silicon or alloy containing a majority of one of the aforementioned or combination thereof. More preferably the metal is a ferrous based metal, nickel or alloy thereof, or copper or alloy thereof. Most preferably the metal is any combination or individually iron, iron alloy including, for example, steels, or nickel or nickel alloy.

In another preferred embodiment, preform 10 is a ceramic. The ceramic may be any suitable such as those known in the art and the particular ceramic may depend on the desired application. The ceramic may have any microstructure, including for example, fibers, platelets, acicular grains, isotropic grains or any combination thereof. Preferred ceramics include, for example, borides, nitrides, carbides, oxides or any mixture thereof (e.g. oxycarbides, carbonitrides etc.) or combination thereof. Particular examples of useful ceramics for the preform 10 include, for example, mullite, silicon carbide, boron carbide, cordierite, silicon nitride, titanium diboride, tungsten carbide, aluminum titanate, aluminum nitride, niobium titanate, aluminum oxide, magnesium oxide, silicon dioxide, silicon hexaboride and combinations thereof.

Figure 3:
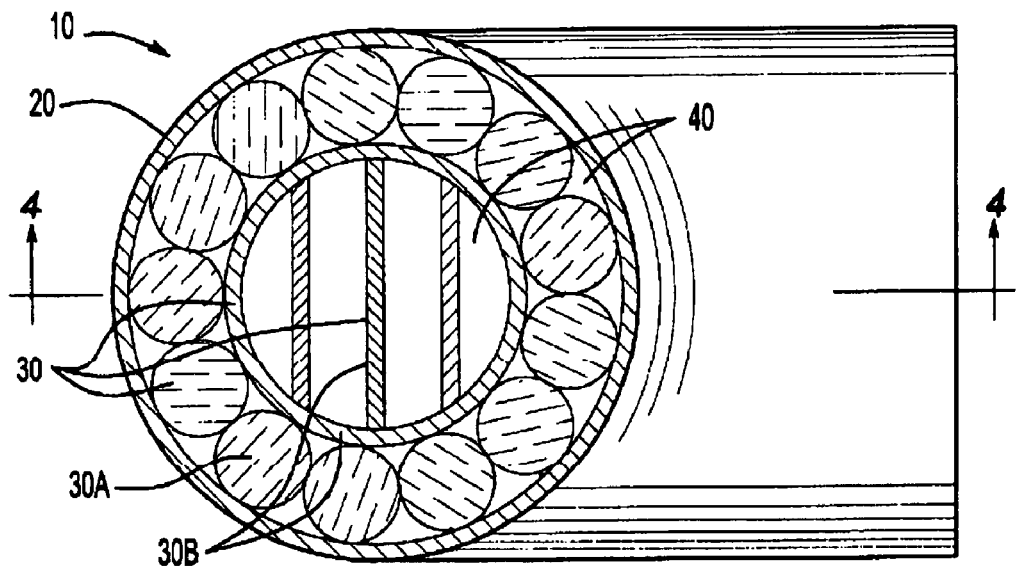
FIG. 3 is a view looking down the channels of another preform useful to make the ceramic-metal body of the present invention.
Figure 4:
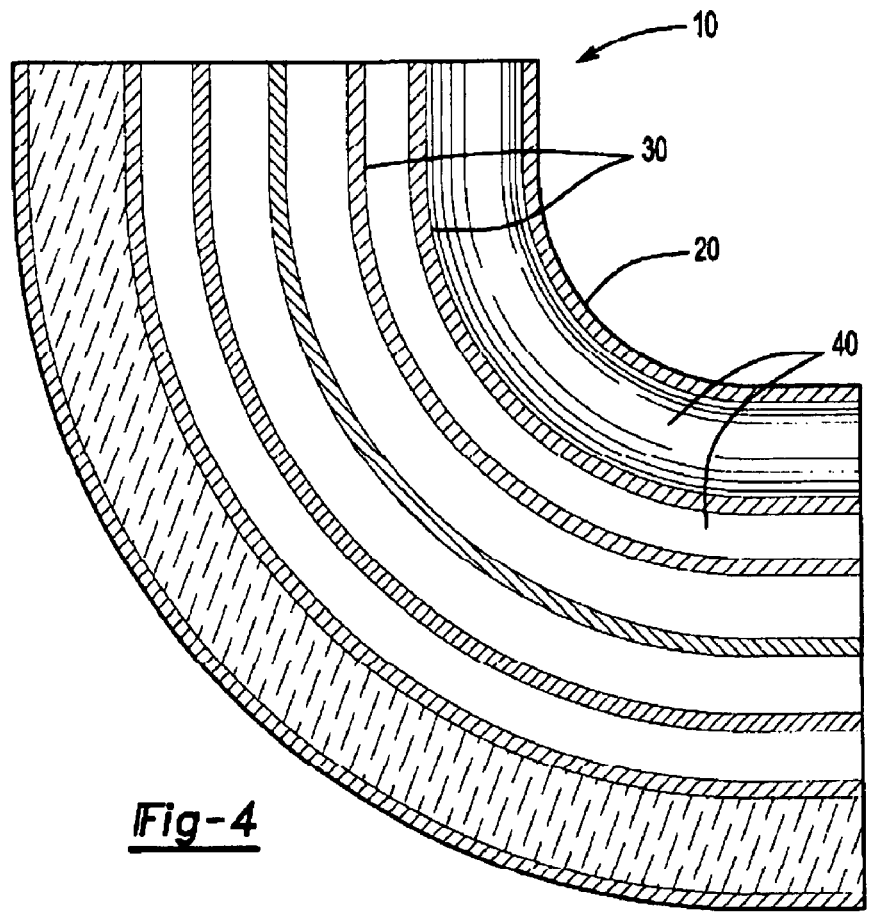
FIG. 4 is a cut away side view of the preform of FIG. 3.

The walls 20 and 30 may be any useful shape in making the ceramic-metal body 140. For example, as illustrated by FIGS. 3 and 4, the walls 20 and 30 may be cylindrical in shape such that the points of contact of each cylinder with another in a packed arrangement defines the channels 40. In this embodiment, the inner cylindrical walls 30A may be formed using fibers or wires or cables that are then laid within an outer wall 20, which may be a tube or pipe. The inner walls 30B may be formed by extrusion or by assembling a tube with flat sheets or ribbons inserted therein.

The walls 20 and/or 30 form channels 40 having a smallest channel diameter 70 within the channels 40 in which ceramic powder 90 is inserted that is greater than the maximum particle size of the inserted ceramic powder 90. The smallest channel diameter 70 means the diameter of the largest hypothetical sphere which can be placed in one end of the channel 40 and pass to the other end of the channel 40 without getting stuck. For example, the square channels 40 of FIG. 1 have a smallest channel diameter 70 that is equal to the length of the squares edge and in this case, since the channels 40 have parallel walls 20 and 30 all along the channel length 80, the channel diameter 70 is equal to the smallest channel diameter.

Generally, the smallest channel diameter of the channels that ceramic powder 90 is inserted into is at least 2 times larger than the maximum particle size of the inserted ceramic powder 90. This ensures that the inserted ceramic powder 90 has a reduced possibility of creating a bridge blocking off the channel 40 such that channel 40 cannot be filled further with the ceramic powder 90. It is preferred that the smallest channel diameter is at least 5 times, more preferably at least 7 times and most preferably at least 10 times larger than the maximum particle size of the ceramic powder 90 inserted into the channels 40.

In forming the preform 10, any suitable ceramic, ceramic-metal composite or metal forming method or technique may be used as well as assembling separate components and securing them together by any suitable bond such as, but not limited to, mechanical (e.g., compression fit) or chemical (e.g., fusing, welding, brazing or combinations thereof). Exemplary methods of forming the preform 10 include boring out the channels, extruding through a die to form the channels, folding corrugated sheets, bonding mechanically or chemically components to form the preform 10.

Figure 2:
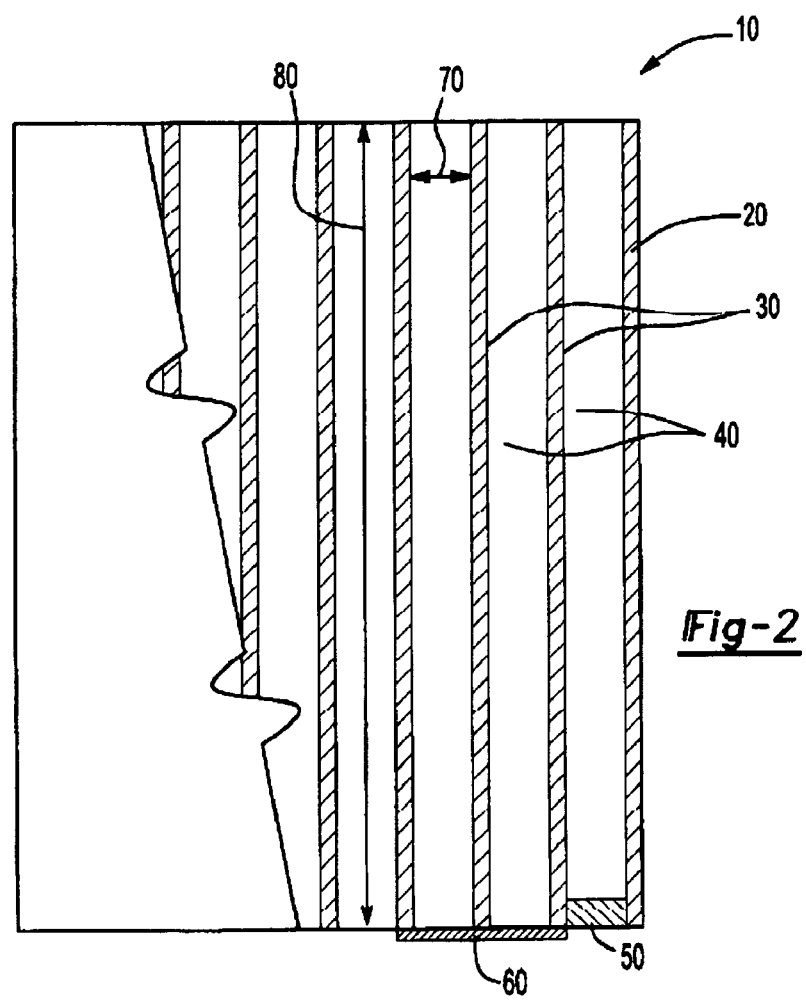
FIG. 2 is a cut away side view of the preform of FIG. 1.

In a preferred embodiment, the preform 10 is a honeycomb that may be of any external shape including the ends having something other than a flat surface (e.g., hemispherical and a raised central portion. The channels 40 may be of any channel length 80 depicted in FIG. 2. Typically the channel length 80 will be at least about 2 times the smallest channel diameter. Of course, the channel length 80 may be several times, ten times, twenty times or more than the smallest channel diameter. At some point, however, the channel length 80 may be so long or narrow that they may not be easily filled with inserted ceramic powder 90.

The ceramic powder 90 inserted into channels 40, may be any ceramic powder useful to make a ceramic-metal composite such as those known in the art so long as it is, generally, comprised of at least about 10% by volume of a reactive ceramic powder. The ceramic powder 90 may be a boride, oxide, carbide, nitride, silicide or combination thereof. Combinations include, for example, borocarbides, oxynitrides, oxycarbides and carbonitrides. Preferred ceramics include SiC, $B_4C$, $Si_3N_4$, $Al_2O_3$, $TiB_2$, $SiB_6$, $SiB_4$, AlN, ZrC, ZrB and combinations thereof. The ceramic powder 90 is comprised of a reactive ceramic. Reactive ceramic means that it reacts with the infiltrating molten metal during infiltration or subsequent heat treatment to form a ceramic reaction product of the reactive ceramic and infiltrated metal (channel metal 160). Preferably, the ceramic powder 90 is comprised of, in ascending preference of at least 50%, 60%, 70%, 80%, 90%, 95% by volume of the reactive ceramic powder. In a most preferred embodiment the ceramic powder 90 is solely the reactive ceramic powder, which may be a combination of reactive powders.

The inserted ceramic powder 90 may also be mixed with a metal powder 91, which, may, for example, aid in infiltrating the molten metal to form the channel ceramic metal composite 150 in the channel 40. It is preferred that the metal powder 91 substantially fails to melt during the infiltrating of the molten metal. Substantially fails to melt means herein that the metal powder 91 at most melts at the surface of the metal powder 91, which may occur due to alloying of the surface from elements in the molten metal. The amount of metal powder 91 mixed with the inserted ceramic powder 90 is generally at most about 70% by volume of the ceramic powder 90. Preferably, when present, the amount of metal powder is at most about 50%, more preferably at most about 30%, even more preferably at most about 15% and most preferably at most about 10% by volume of the total amount of inserted powder 90 including the metal powder 91.

The ceramic powder 90 may be inserted into the channels 40 by any suitable method. The ceramic powder 90 may be inserted dry, combined with a liquid or plastic. For example, if the ceramic powder 90 is dry it may be poured in the channels 40 and channel filling may be facilitated by shaking or application of vibration to the preform 10.

Alternatively, the ceramic powder 90 may be inserted by mixing the ceramic powder 90 with a liquid, whereby the suspension is of viscosity that is low enough that it may be simply poured, injected or squirted into a channel 40 and the liquid medium removed, exemplary methods being described by U.S. Pat. Nos. 4,200,604 and 6,803,015. In another method, the ceramic powder 90 may be inserted by forming a plastic mass using suitable methods such as those known in the art to extrude ceramics by adding organic additives (e.g., dispersants, lubricants, and binders) and injecting the paste into a channel such as described in Chapter 21, of *Introduction to the Principles of Ceramic Processing*, J. Reed, John Wiley and Sons, NY, 1988.

When using a mixture of ceramic powder 90 and a dispersing liquid having a low viscosity, the mixture is generally fluid enough to be inserted into one end of a channel 40 of preform 10 and subsequently flow through the channel 40 and collect at the other end of the channel 40, for example, from the mere exertion of gravity. Thus, the mixture may deposit, for example, a layer of ceramic powder 90 on the walls 20 and/or 30 or completely fill the channel 40. Generally, the viscosity of the mixture, when using this method, is at most about 1000 centipoise (cp), more preferably the mixture has a viscosity of at most about 200 cp, even more preferably at most about 100 cp and most preferably at most about 20 cp.

The dispersing liquid may be, for example, water, any organic liquid, such as an alcohol, aliphatic, glycol, ketone, ether, aldehyde, ester, aromatic, alkene, alkyne, carboxylic acid, carboxylic acid chloride, amide, amine, nitrile, nitro, sulfide, sulfoxide, sulfone, organometallic or mixtures thereof. Preferably, the dispersing liquid is water, an aliphatic, alkene or alcohol. More preferably, the liquid is an alcohol, water or combination thereof. When an alcohol is used it is preferably methanol, propanol, ethanol or combinations thereof. Most preferably, the alcohol is propanol.

The mixture may contain other useful components, such as those known in the art of making ceramic suspensions or pastes. Examples of other useful components include dispersants, deflocculants, flocculants, plasticizers, defoamers, lubricants and preservatives, such as those described in Chapters 10-12 of *Introduction to the Principles of Ceramic Processing*, J. Reed, John Wiley and Sons, NY, 1988. A preferred binder in the mixture is one that is soluble in the dispersing liquid, but not soluble in water.

The mixture may also contain binders. Examples of binders include cellulose ethers, such as those described in Chapter 11 of Introduction to the *Principles of Ceramic Processing*, J. Reed, John Wiley and Sons, NY, NY, 1988. Preferably, the binder is a methylcellulose or ethylcellulose, such as those available from The Dow Chemical Company under the trademarks METHOCEL and ETHOCEL. Preferably, the binder dissolves in the dispersing liquid.

The ceramic powder 90 may fill some or all of the channels 40 such that there may be partially filled channels 105 and unfilled channels 100 after the ceramic powder 90 is inserted into the channels 40. It is preferred that all of the channels 40 are substantially filled. Substantially filled means that the ceramic powder 90, not including the void space between the particles of the ceramic powder 90, occupies at least about 95% of the volume of channels 40. More preferably the powder completely fills the channels 40.

Figure 7:
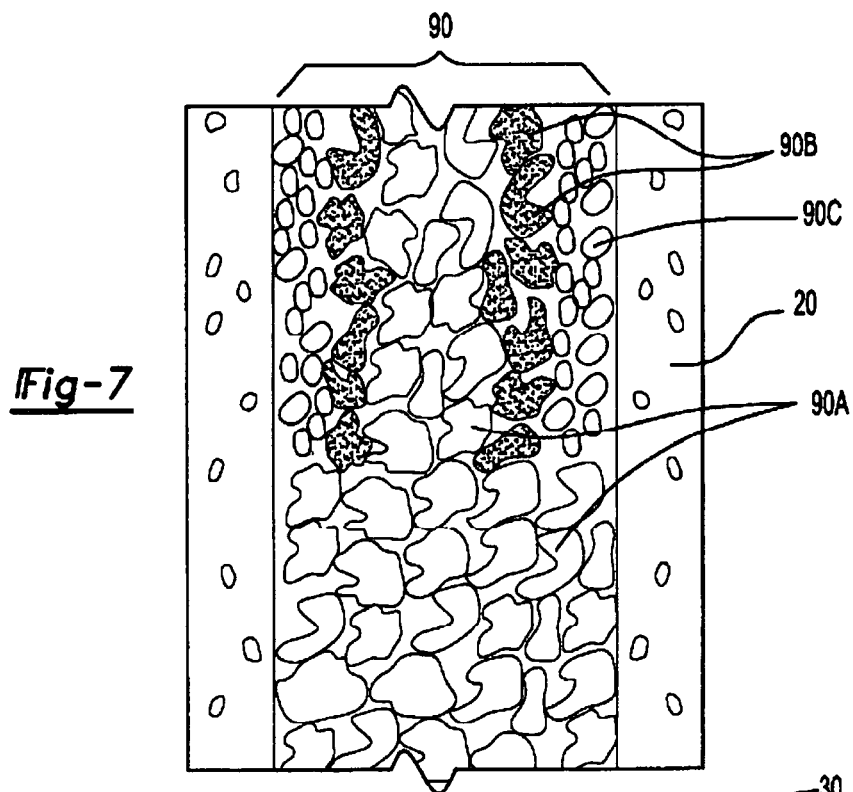
FIG. 7 is a cross-section of a channel of another preform filled with a ceramic powder to form the ceramic-metal body where the channel has various ceramic powders within the channel.

In another embodiment, the ceramic powder 90 is inserted such that it coats the walls 20 and/or 30 to some thickness, leaving a void down the channel length 80 of the channel 40. After this a second differing ceramic powder 90 may be inserted in the remaining volume to make a channel 40 having a gradient structure from the wall 20 and/or 30 to the center of the channel 40. FIG. 7 illustrates one possible aforementioned gradient where ceramic powder 90 is comprised of three differing powders. In this illustration ceramic powder 90A has the same particle size as ceramic powder 90B but a different chemistry and ceramic powder 90C has the same chemistry as 90A, but a different particle size. Likewise, the preform 10 with ceramic powder 90 coated on walls 20 and/or 30 may be infiltrated with metal (channel metal 160) and then a subsequent ceramic powder inserted in the channel 40 may be coated onto the channel remaining after the first metal has infiltrated. This second inserted ceramic powder may be infiltrated. This sequence of steps may be repeated as often as desired and preferably until the channel 40 are completely filled having a gradient structure across the channel diameter 70.

In a similar manner, a channel 40 may be partially filled with a ceramic powder 90, and then filled further with another ceramic powder 90 having a different chemistry, particle packing or particle size to create a gradient structure down the channel length 80 of the channel 40. Returning to FIG. 7, ceramic powder 90A may first be inserted into channel 40 and then the other powder 90A, B and C inserted and infiltrated as described in the previous paragraph to create a gradient structure along channel length 80 and along the channel diameter along a portion of channel 40. Any combinations of filling the channels 40 of preform 10 may be utilized as desired. Examples include, but in no way limit the potential combinations, are where (1) at least one channel 40 has a different ceramic powder 90 than that inserted into another channel 40, (2) the ceramic powder 90 inserted into at least one channel 40 differs within the channel 40 either along the channel length 80 of the channel 40 or across the channel diameter 70 of the channel 40. The ceramic powder 90 differs when at least one characteristic of the ceramic powder 90 varies such as the composition, chemistry, packing, particle size or combination thereof. Differs, herein, means that a characteristic, such as one of the aforementioned, is statistically different by known standard methods to determine such characteristics. It is also understood that differs refers not to individual microstructural features such as a grain of a ceramic within a metal-ceramic composite, but, generally, to regions that are a volume of at least about 10 times greater than the average grain size of the ceramic grains within the channel ceramic-metal composite 150. Such differences may be determined by known microscopic methods such as on polish sections to determine the grain size of the ceramic grains, packing of the ceramic particles, chemistry and the like.

In a preferred embodiment, within at least one channel 40, the ceramic powder 90 varies in composition, packing or combination thereof.

When using a liquid or polymeric medium to suspend the ceramic powder 90, the suspending medium may be removed by any suitable method. For example when the medium is a liquid, such as water or alcohol, the liquid may be removed by drying in air, drying by application of heat or vacuum, or by removing it by blocking the channel 40 ends on one end of the preform 10 with a porous medium that removes the dispersing liquid by capillary action. An example of such a porous medium is plaster of Paris, such as that used in slip casting ceramics. To remove any organic liquids that are not removed by evaporative drying or capillary action, the preform 10 with the inserted ceramic powder 90 may be subjected to any suitable process including well known processes such as heating under a suitable atmosphere to effect the removal of such additives.

Figure 8:
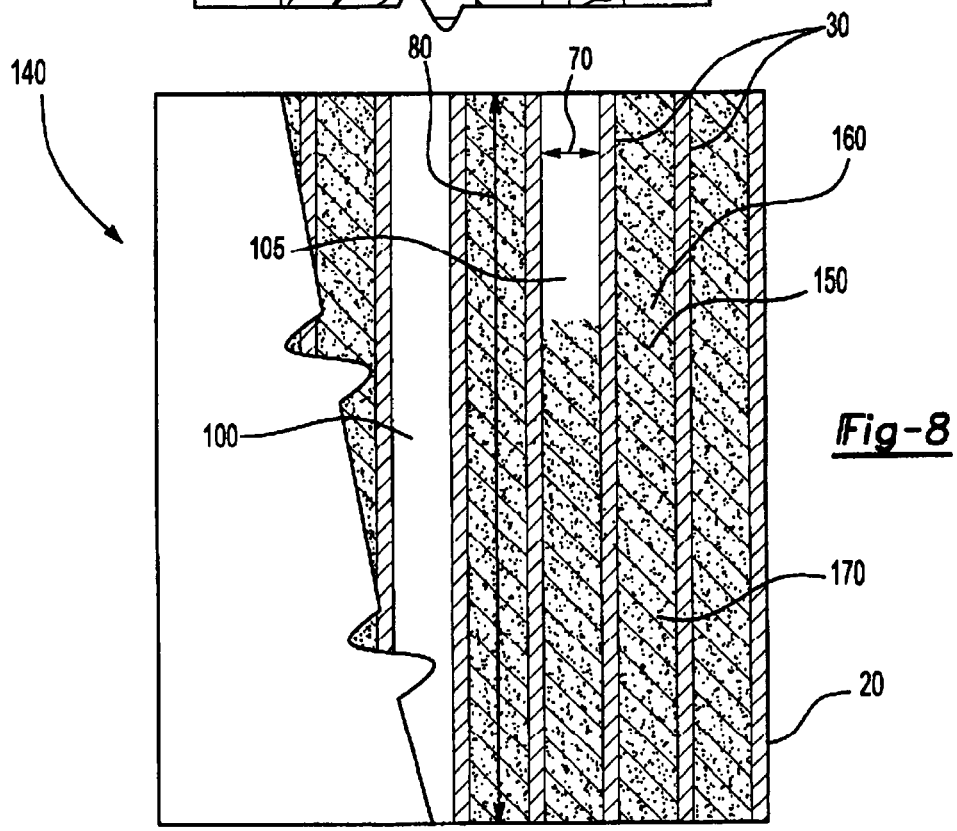
FIG. 8 is a cut away view of the ceramic-metal body of the invention.

Referring to FIG. 8, after the ceramic powder 90 is inserted into the channels 40 of preform 10, molten metal is infiltrated into the ceramic powder 90 such that a channel ceramic metal composite 150 is formed in the channel 40 that is bonded to the walls 20 and/or 30. The infiltration of the molten metal (channel metal 160) may be done by any suitable method such as those known in the art. Exemplary methods include those described by U.S. Pat. Nos. 5,007,475; 5,020,584; 5,298,469; 5,521,016; and 5,775,403.

After the metal has been infiltrated, the body 140 may be further heat treated to react the infiltrated metal (channel metal 160) with the reactive ceramic. Exemplary methods of subsequent heat treatments are described in U.S. Pat. Nos. 5,298,468 and 5,521,016.

The Ceramic-Metal Body

The method of the invention is able to form a ceramic-metal body 140 comprised of a matrix that is a ceramic, metal, ceramic-metal or combination thereof, the matrix having walls 20 and 30 that define channels 40 within the matrix wherein within at least one channel 40 of the matrix is a channel ceramic-metal composite 150 that differs from the walls 20 and 30 of the matrix and the channel ceramic metal composite 150 is comprised of a channel metal 160 and a channel ceramic phase 170 the channel ceramic phase 170 being comprised of a reactive ceramic and a ceramic reaction product of the channel metal 160 and the reactive ceramic. The reactive ceramic is as described above for the reactive ceramic powder Generally, at least about 10% by volume of the reactive ceramic is reacted with the channel metal 160 to form the ceramic reaction product. In ascending preference, the volume of the reactive ceramic that is reacted is at least about 15%, 20%, 30%, 40%, 50%, 60%, 70% and 80%. In a preferred embodiment, the degree of reaction of reactive ceramic is different within at least one channel 40 or between channels 40. For example, the particle size or chemistry (e.g., the reactive powder may be treated, for example, by coating with a metal or other ceramic etc. to slow or speed the reactivity of the powder) of a reactive ceramic powder may be different within each channel 40 resulting in differing reactivity. Likewise, within a channel 40, the volume of the reactive powder that has been reacted may vary along the channel length 80 or channel diameter 70 of channel 40.

In a another preferred embodiment, the ceramic-metal body 140 has, along the channel length 80 of at least one channel 40, a variation of property, structure, chemistry or combination thereof of the channel ceramic-metal composite 150. In ascending preference, at least 15%, 20%, 30%, 40%, 50%, 60%, 70% and 80% of the channels 40 have a varying channel ceramic-metal composite 150. In a most preferred embodiment, all of the channels 40 have a varying channel ceramic-metal composite 150. In a like manner, the channel ceramic-metal composite 150 varies across a channel diameter 70 of a channel or channel 40.

In a preferred embodiment, the channel metal 160 is selected from aluminum, zirconium, titanium, copper, silicon, magnesium, alloys of each of the aforementioned and mixtures thereof. Likewise it is preferred that the reactive ceramic is boron carbide and the channel metal 160 is comprised of aluminum and the ceramic reaction product is comprised of at least one ceramic selected from (a) $AlB_2$,
(b) $Al_4BC$,
(c) $Al_3B_{48}C_2$,
(d) $AlB_{12}$, and
(e) $AlB_{24}C_4$.

Preferably, the ceramic reaction product is comprised of at least two of these ceramics. It is also preferred for these preferred embodiments that all of the channels 40 have the described channel metal or metals 160 and channel ceramic phase 170.

A further illustration of the usefulness of the present invention is where a portion of the body 140 is subject to tensile or shearing stress such as the inner hub of a brake rotor, the channels 40 there may desirably have a high toughness channel ceramic metal composite 150 (e.g., a ceramic powder mixed with metal powder giving a greater toughness channel ceramic-metal composite 150), whereas the channels 40 where the brake rotor contacts a brake pad may desirably have a more wear resistant channel ceramic metal composite 150 (e.g., one that is almost all ceramic, which may be derived by using solely reactive ceramic powder). Likewise, the use of an insert of the invention's body 140 may be attached to a metal brake rotor. Illustratively, such an insert can have a tougher channel ceramic-metal composite 150, that is with substantial amounts of metal such as greater than 50% that is mounted to the metal brake rotor, for example, by a mechanical fastener with the opposite end that contacts the brake pad being almost all ceramic for improved wear properties as just described above.

EXAMPLES

Example 1

A 2 inch by 2 inch wide and 1 inch deep mullite honeycomb having 2×2 mm wide channels and wall porosity of 60% was filled with two slurries with alternating channels being filled by each slurry. The mullite honeycomb was produced by The Dow Chemical Company in a manner as shown in U.S. Pat. Publication 2005/0115214. The first slurry contained 20% by volume ESK 1500 $B_4C$ powder (TETRABOR ESK 1500, ESK Ceramics GMBH & Co., Kempten, Germany) in 7 pH water. The second slurry contained 15% by volume of a mixture containing by volume 90% $TiB_2$ (HCT 30D, available from General Electric Company, GE Advanced Materials Unit, Wilton, Conn.) and 10% $B_4C$ (ESK 1500). The average particle size of the $B_4C$ was 3-5 microns and average size of the $TiB_2$ was 14 microns. The slurries were placed into selective channels of the mullite honeycomb (checkerboard) using a thin plastic tube and eye-dropper. The channel filled honeycomb was dried for 24 hours at 80° C. The dried filled honeycomb was placed into a steel die and heated in air to about 400° C. The preheated part was transferred to a pressure casting unit (THT Presses, Inc., Dayton, Ohio) and molten aluminum was injected into the part for about 5-10 seconds. The liquid metal easily penetrated all openings producing dense walls and channels. The ceramic-metal part consisted of two types of ceramic-metal channels isolated by the continuous network of Al-Mullite composite. The first set of channels had a ceramic metal composite with aluminum metal, boron carbide and ceramic reaction phases $AlB_2$ and a solid solution phase $Al_{(3-4)}BC$ and the other set of channels had a ceramic-metal composite containing Al, $TiB_2$, $B_4C$, and ceramic reaction phase $AlB_2$.

Example 2

The same process was applied as in Example 1 except that the channels were filled in 5 layers from bottom to top with varying sizes of reactive $B_4C$ particles. The varying sizes were made by mixing various ratios of two grades of $B_4C$ powders (TETRABOR F1200 and F180, ESK Ceramics GMBH & Co., Kempten, Germany). The powders were inserted dry into the channels and the entire honeycomb was tapped and shook for about 10 seconds to increase the particle packing after each layer was introduced. The thickness of each layer was about 2 mm. The powder composition of the layers starting from one end were: (I) 100% F1200, (II) 75% F1200:25% F-180, (III) 50% F1200:50% F180, (IV) 25% F1200: 75% F180 and (V) 100% F180. After infiltration, the ceramic metal body was heat-treated at 700° C. for 10 hours. The ceramic metal body had a graded structure varying in Vickers hardness from about 1100 Kg.mm$^2$ on one side to about 400 kg/mm$^2$ on the opposite side.

What is claimed is:

1. A ceramic-metal body comprised of a matrix that is a ceramic, metal, ceramic-metal or combination thereof, the matrix having walls that define channels within the matrix wherein within at least one channel of the matrix is a channel ceramic-metal composite that has a different microstructure, chemistry or combination thereof than the walls of the matrix and the channel ceramic metal composite is comprised of a channel metal and a channel ceramic phase the channel ceramic phase being comprised of a reactive ceramic and a ceramic reaction product of the channel metal and the reactive ceramic, wherein said ceramic-metal body has a density that is at least 99% of theoretical density.

2. The ceramic-metal body of claim 1 wherein along the length of at least one channel the channel ceramic-metal composite varies in property, structure, chemistry or combination thereof.

3. The ceramic-metal body of claim 1 wherein the channel ceramic-metal composite has a different structure, chemistry, property or combination thereof than the channel ceramic-metal composite in another channel of the ceramic-metal body.

4. The ceramic-metal body of claim 3 wherein along the length of at least 50% of the channels, the channel ceramic-metal composite varies in property, structure, chemistry or combination thereof.

5. The ceramic-metal body of claim 1 wherein in at least one channel the channel ceramic-metal composite varies in property, structure, chemistry or combination thereof along a cross-sectional dimension of said channel.

6. The ceramic-metal body of claim 1, wherein the reactive ceramic is boron carbide and the ceramic reaction product is comprised of at least one ceramic selected from
(a) $AlB_2$,
(b) $Al_4BC$,
(c) $Al_3B_{48}C_2$,
(d) $AlB_{12}$, and
(e) $AlB_{24}C_4$.

7. The ceramic-metal body of claim 6, wherein the channel ceramic-metal composite of at least one channel is comprised of at least two ceramics selected from:
(a) $AlB_2$,
(b) $Al_4BC$,
(c) $Al_3B_{48}C_2$,
(d) $AlB_{12}$, and
(e) $AlB_{24}C_4$.

8. The ceramic-metal body of claim 7, wherein the channel ceramic-metal composite of all of the channels is comprised of at least two ceramics selected from:
(a) $AlB_2$,
(b) $Al_4BC$,
(c) $Al_3B_{48}C_2$,
(d) $AlB_{12}$, and
(e) $AlB_{24}C_4$.

9. The ceramic-metal body of claim 1 wherein the channel metal is aluminum, zirconium, titanium, copper, silicon, magnesium, alloys of each of the aforementioned and mixtures thereof.

10. The ceramic-metal body of claim 1 wherein the channel ceramic-metal composite has a nominal largest ceramic grain size substantially less than the smallest channel diameter of the channels.

11. The ceramic-metal body of claim 10 wherein the nominal largest ceramic grain size is at least about 5 times smaller than the smallest channel diameter of the channels.

12. The ceramic-metal body of claim 6 wherein the channel ceramic metal composite of at least one channel contains a ceramic that is unreacted with the metal of said ceramic-metal composite.

13. The ceramic-metal body of claim 1 wherein the matrix is ceramic, metal or combination thereof.

14. The ceramic-metal body of claim 13 wherein the matrix is ceramic.

15. The ceramic-metal body of claim 13 wherein the matrix is metal.

16. The ceramic-metal body of claim 1 wherein the matrix is porous.

17. The ceramic-metal body of claim 1 wherein the matrix is dense.

18. A structural component comprised of the ceramic-metal body of claim 1.

19. The structural component of claim 18 wherein the structural component is a vehicular structural component.

20. The structural component of claim 19 wherein the vehicular structural component is a braking or suspension component.

* * * * *